United States Patent
Salter et al.

(10) Patent No.: US 11,738,713 B2
(45) Date of Patent: Aug. 29, 2023

(54) VEHICLE SECURITY SYSTEM

(71) Applicant: Ford Global Technologies, LLC, Dearborn, MI (US)

(72) Inventors: Stuart C. Salter, White Lake, MI (US); Kendra White, Redford, MI (US); Annette Lynn Huebner, White Lake, MI (US); Kristopher Karl Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 760 days.

(21) Appl. No.: 16/750,250

(22) Filed: Jan. 23, 2020

(65) Prior Publication Data

US 2021/0229627 A1    Jul. 29, 2021

(51) Int. Cl.
*B60R 25/01* (2013.01)
*B60R 25/24* (2013.01)
*B60R 25/30* (2013.01)
*B60R 25/31* (2013.01)

(52) U.S. Cl.
CPC .............. *B60R 25/01* (2013.01); *B60R 25/24* (2013.01); *B60R 25/305* (2013.01); *B60R 25/31* (2013.01); *B60R 2325/20* (2013.01)

(58) Field of Classification Search
CPC ....... B60R 25/01; B60R 25/24; B60R 25/305; B60R 25/31; B60R 2325/20
See application file for complete search history.

(56) References Cited

U.S. PATENT DOCUMENTS

| | | | |
|---|---|---|---|
| 6,345,767 B1* | 2/2002 | Burrus, IV | B60H 1/00735 236/1 R |
| 7,688,179 B2* | 3/2010 | Kurpinski | G07C 9/00309 340/4.1 |
| 8,054,203 B2 | 11/2011 | Breed et al. | |
| 8,149,083 B2 | 4/2012 | Suzuki et al. | |
| 8,203,424 B2 | 6/2012 | Ghabra et al. | |
| 8,228,166 B2* | 7/2012 | Eberhard | E05F 15/76 340/5.72 |
| 9,790,729 B2* | 10/2017 | Bradley | E05F 15/70 |
| 10,266,151 B2 | 4/2019 | De Wind et al. | |
| 2018/0203464 A1 | 7/2018 | Yu et al. | |
| 2018/0204399 A1* | 7/2018 | Newman | G07C 9/28 |
| 2018/0229587 A1* | 8/2018 | Gao | G01K 13/00 |
| 2019/0197325 A1* | 6/2019 | Reiley | G08B 13/19602 |
| 2019/0308587 A1* | 10/2019 | Salter | B60R 25/104 |

* cited by examiner

*Primary Examiner* — Thomas D Alunkal
(74) *Attorney, Agent, or Firm* — Frank A. MacKenzie; Bejin Bieneman PLC

(57) ABSTRACT

A computer includes a processor and a memory. The memory stores instructions executable by the processor to determine, based on vehicle sensor data, that an object is present in a vehicle compartment; and to actuate the vehicle compartment to close based on the object presence, a user proximity to the vehicle, and environmental data including at least a risk index and an environmental condition.

18 Claims, 5 Drawing Sheets

VEHICLE SECURITY SYSTEM

BACKGROUND

Vehicles can carry objects such as cargo that is loaded and unloaded from the vehicle. It is a problem to monitor and safeguard objects in a vehicle during a loading or unloading process, especially where a vehicle may be configured for autonomous operation and not attended or operated by a human operator.

DETAILED DESCRIPTION

Introduction

Figure 1:
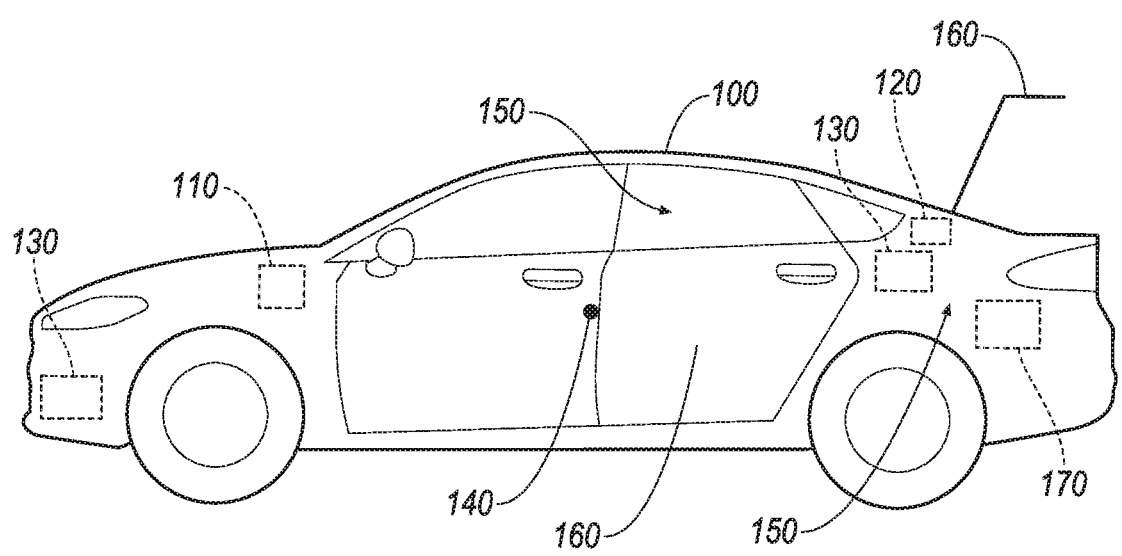
FIG. 1 shows an exemplary vehicle.

Disclosed herein is a computer comprising a processor and a memory. The memory stores instructions executable by the processor to determine, based on vehicle sensor data, that an object is present in a vehicle compartment, and to actuate the vehicle compartment to close based on the object presence, a user proximity to the vehicle, and environmental data including at least a risk index and an environmental condition.

The instructions may further include instructions to actuate the vehicle compartment to open upon determining that at least one of the user and a second authorized user are within a proximity of the vehicle.

The instructions may further include instructions to identify the vehicle compartment based on the vehicle object presence, and actuate a second vehicle compartment to close while the user is within the proximity of the vehicle upon determining that the risk index exceeds a threshold.

The vehicle compartment may be a vehicle trunk, a vehicle passenger cabin, or a container.

The instructions may further include instructions to determine a number of mobile devices present within a distance of the vehicle, and to determine the risk index based on the number of the mobile devices present within the distance of the vehicle.

The instructions may further include instructions to determine the risk index based on a time of day.

The instructions may further include instructions to determine a risk threshold based on a type of identified object stored in the vehicle compartment and actuate the compartment to close further based on the determined risk threshold.

The instructions may further include instructions to determine a distance threshold based on a location of the vehicle, wherein a first distance threshold for a first area with a first risk index is less than a second distance threshold for a second area with a second risk index less than the first risk index.

The instructions may further include instructions to determine that the risk index is below a threshold upon determining that an average absence interval of the user is shorter than a time threshold; and maintain the vehicle compartment in an open state upon determining that the risk index is less than a risk threshold.

The instructions further include instructions to identify the user based on stored user identification data and data received from vehicle sensors including an audio sensor, an image sensor, or a wireless communication interface.

The instructions may further include instructions to identify a second authorized user based on a proximity of a mobile device, image data received from a vehicle camera sensor, or audio data received from a vehicle audio sensor stored data, and to actuate the vehicle compartment to open upon determining that the second authorized user is proximate to the vehicle while the user is not proximate to the vehicle.

The instructions may further include instructions to determine that a user is proximate to the vehicle upon (i) determining that a user mobile device is within a distance of the vehicle, or (ii) identifying the user based on image data received from the vehicle camera sensor.

The instructions may further include instructions to identify the second authorized user upon recognizing a verbal communication of the user and the second authorized user exceeding a minimum time threshold based on the received audio data.

The instructions may further include instructions to identify the second authorized user upon recognizing an interaction of the user and the second authorized user exceeding a minimum time threshold based on the received image data.

The instructions may further include instructions to maintain a second vehicle compartment in a locked state upon determining that a risk index exceeds a first threshold and is less than a second threshold.

The instructions may further include instructions to unlock the second vehicle compartment upon determining that the risk index is less than the first threshold.

The instructions may further include instructions to actuate the vehicle compartment to close upon determining that the user is not proximate to the vehicle based on a distance of the user to the vehicle and determining, based on an ambient temperature included in the environmental condition and an object temperature, that a difference between the object temperature and the ambient temperature exceeds a threshold.

The environmental data includes an ambient light intensity and the instructions further include instructions to actuate the vehicle compartment to close based on the ambient light intensity.

Further disclosed herein is a computer, comprising a processor and a memory. The memory stores instructions executable by the processor to, upon determining based on vehicle sensor data that a vehicle user is within a specified distance of the vehicle, identify a first vehicle compartment for the user based on stored data and a location of the user relative to the vehicle, then, upon determining that a risk index exceeds a first threshold and is less than a second threshold, to actuate a first vehicle compartment to unlock the first vehicle compartment while maintaining a second vehicle compartment at a locked position, and upon determining that the risk index is less than the first threshold, to actuate the second vehicle compartment to unlock.

The instructions may further include instructions to determine a number of mobile devices present within a distance of the vehicle, and to determine the local risk index based on the number of the mobile devices present within the distance of the vehicle.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

A vehicle can include sensors that provide data to a computer about a vehicle interior and/or an environment exterior to the vehicle. The vehicle computer can be programmed to determine, based on vehicle sensor data, that an object is present in a vehicle compartment. The computer can be further programmed to actuate the vehicle compartment, e.g., a door or cover thereof, to close based on one or more of detecting that the object is present, user proximity to the vehicle, and environmental data including at least one of a local risk index, an ambient light condition, and a local weather condition (or environmental condition).

Additionally or alternatively, the computer can be programmed to, upon determining based on vehicle sensor data that a vehicle user is within a specified distance of the vehicle, identify a first vehicle compartment for the user based on stored data and a location of the user relative to the vehicle, then, upon determining that a local risk index exceeds a first threshold and is less than a second threshold, to actuate a first vehicle compartment to unlock the first vehicle compartment while maintaining a second vehicle compartment at a locked position. The computer can be further programmed to, upon determining that the local risk index is less than the first risk index, actuate the second vehicle compartment to unlock.

FIG. 1 illustrates a vehicle 100 and one or more object(s) 170 stored in the vehicle 100. The vehicle 100 may be powered in a variety of ways, e.g., with an electric motor and/or internal combustion engine. The vehicle 100 may be a land vehicle such as a car, truck, etc. A vehicle 100 may include a computer 110, actuators 120, and sensors 130. The vehicle 100 can have a reference point 140, e.g., a geometrical center where a longitudinal axis and a lateral axis of a vehicle 100 body intersect. The vehicle 100 may include one or more compartment(s) 150. The vehicle 100 compartment 150 is a space inside the vehicle 100 that can be closed and opened by a vehicle 100 actuator 120. A compartment 150 may be a vehicle 100 trunk, a vehicle 100 passenger cabin, roof storage container (e.g., to store sports equipment), and/or a container, e.g., a trailer attached to the vehicle 100 via a hitch assembly. A compartment 150 typically has a closure mechanism 160 such as a liftgate, door, etc.

The computer 110 includes a processor and a memory such as are known. The memory includes one or more forms of computer-readable media, and stores instructions executable by the computer 110 for performing various operations, including as discussed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a controller, a control unit located in the vehicle 100, e.g., an electronic control unit (ECU) such as a brake controller, etc. The vehicle 100 may include various components or sub-systems, each including one or more sensors 130, actuators 120, controllers, etc. For example, the vehicle 100 may include a brake component including brake sensors 130, brake actuators 120, and/or other electronic, electrical, and/or mechanical, elements that stop the vehicle 100 based on commands received from a controller such as a computer 110. As another example, the vehicle 100 may include a powertrain component or sub-system that may include one or more actuators 120, sensors 130, etc., in addition to an engine, electric motor, and/or a transmission. The vehicle 100 includes one or more actuators 120 to close and/or open a vehicle 100 compartment 150, e.g., by actuating an actuator 120, e.g., an electric motor, to open and/or close a liftgate 160 of a trunk compartment 150.

The sensors 130 may include a variety of devices to provide data to the computer 110. For example, the sensors 130 may include object detection sensors 130 such as camera sensor(s) 130, radar sensor(s) 130, infrared sensor(s) 130, ultrasonic sensor(s) 130, etc., disposed in and/or on the vehicle 100 that provide relative locations, sizes, shapes of objects exterior to the vehicle 100 such as other vehicles, and/or object(s) 170 in a vehicle 100 compartment 150, e.g., in the trunk.

The computer 110 may be programmed to determine that an object 170 is present in the vehicle 100 by detecting the object 170 in a vehicle compartment 150 based on data received from a vehicle 100 object detection sensor 130 such as a camera sensor 130, infrared sensor 130, ultrasonic sensor 130, LIDAR (Light Detection and Ranging) sensor 130, etc. The computer 110 may be programmed to detect a number of object(s) 170, dimensions, type, weight, etc. based on the received sensor 130 data using image processing techniques. For example, an object type may be a package, a box, a bag (e.g., a grocery bag), sports equipment, furniture, etc. The computer 110 may be programmed to detect objects, and determine a number of objects, including a number of objects of a type such as bags or boxes, in the vehicle 100 trunk (or trunk compartment 150) based on the received sensor (e.g., camera) 130 data.

The sensors 130 may include a thermal imaging sensor 130, e.g., an infrared sensor 130, providing infrared data from the vehicle 100 compartment(s) 150. The infrared sensors 130 may further include excitation sources and infrared receivers. The excitation sources may illuminate the vehicle 100 compartment 150 with infrared radiation. A reflection of the infrared illumination may be captured by the infrared sensor 130 as an infrared data. An infrared image in the form of digital data may be received by the computer 110 as is known. The computer 110 may be programmed to estimate a temperature of a detected object 170 based on the received infrared image data from the infrared sensor 130.

The computer 110 may be programmed, for example, upon detecting an object 170 and classifying the object 170, based on applying image recognition techniques to an image in which the object 170 is detected, to estimate a temperature of an object 170 based on data stored in a computer 110 memory that specifies an estimated temperature of each type of food object 170. Additionally or alternatively, the computer 110 may be programmed to estimate the temperature of the object 170 based on data received from a vehicle 100 sensor 130, e.g., a thermal sensor 130 such as an infrared sensor 130. In the present context, a type of object 170 may be room temperature object (e.g., tools, home supply, pantry-stored food, etc.), hot food object 170 (e.g., hot pizza), or cold object 170 (e.g., ice cream, cold drink, etc.). For example, the computer 110 may be programmed to detect an ice cream box object 170 based on textual and visual information of an object 170 and estimate a temperature, e.g., −12 degrees Celsius, for the ice cream based on stored data in the computer 110 memory (e.g. Table 1).

TABLE 1

| Food type | Temperature |
| --- | --- |
| Neutral, e.g., for food pantry | ambient temperature |
| Cold, e.g., ice cream | −12 degrees Celsius |
| Hot, e.g., pizza delivery | 60 degrees Celsius |

The vehicle 100 may include one or more audio sensor(s) 130 such as microphones disposed in the vehicle 100, e.g., a vehicle 100 compartment 150, on an exterior surface, etc., providing audio data. The audio data may be received by the computer 110 through a suitable interface, e.g., an analog-to-digital converter circuit. The computer 110 may be programmed to detect a human user by analyzing audio data received from sensors 130 utilizing signal processing algorithms. The computer 110 may be programmed to identify one or more vehicle 100 user(s) based on a user identification datum or data stored in a computer 110 memory. User identification data, in the present context, is conventional biometric data for which techniques are known for identifying a user, e.g., use identification data can include data specifying characteristics of an individual's voice such as pitch, volume, tone, etc. Stored user identification data, in this context, can be associated with an "authorized" user, i.e., upon matching sensor 130 data to stored identification data, a user can be granted access (e.g., entering the vehicle 100, operating the vehicle 100, etc.) to a vehicle 100. In one example, an authorized user may be authorized to access a vehicle 100 for a limited time or at a specified location or locations, e.g., so that the user can ride in the vehicle for a planned ride from an origin to a destination. As another example, an individual user may have permanent or long term access to the vehicle 100, i.e., access is not limited to a specified time period and/or location(s).

Figure 2:
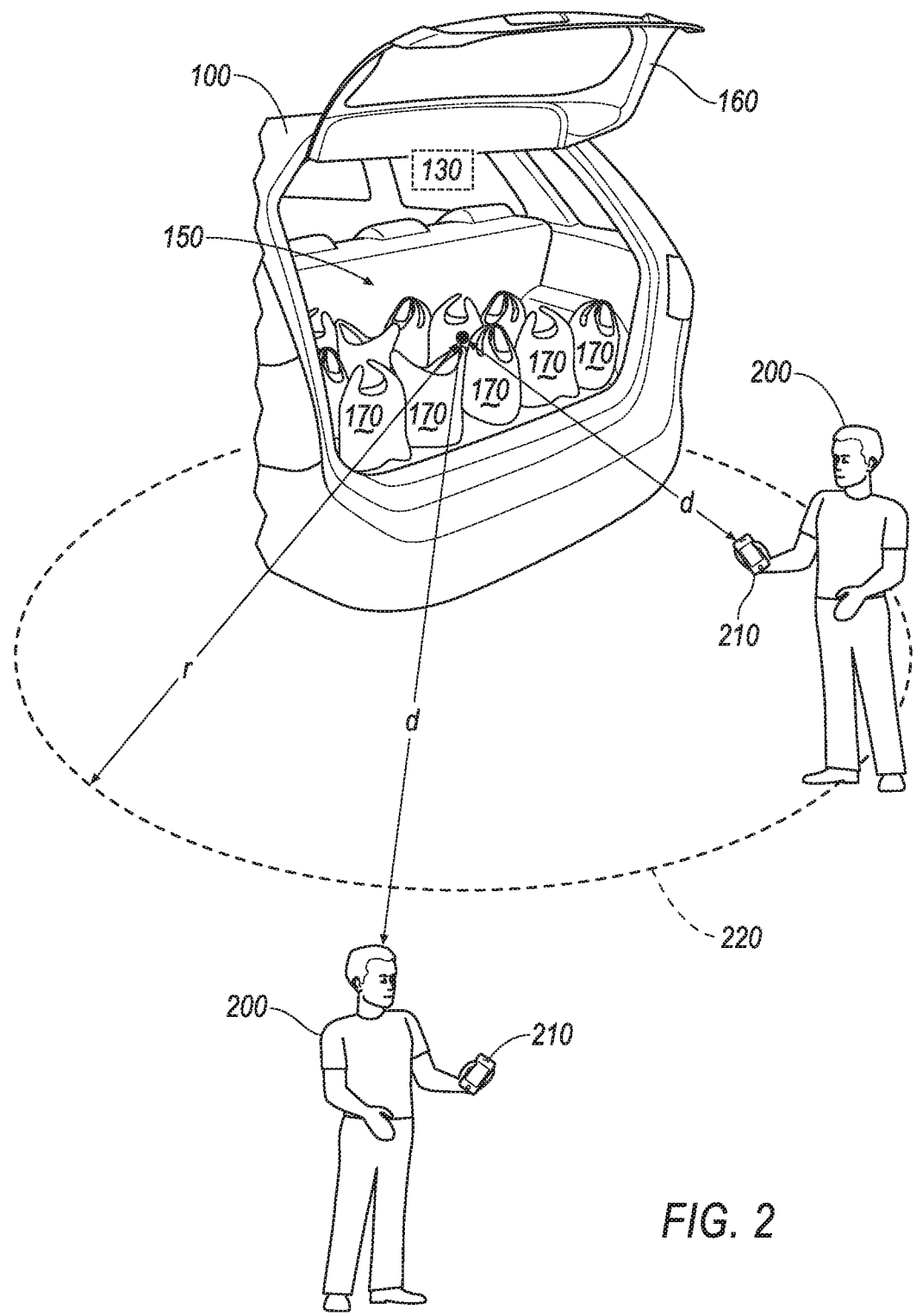
FIG. 2 shows object(s) stored in a compartment of the vehicle of FIG. 1.

With reference to FIGS. 1-2, the computer 110 may be programmed to detect an individual user 200 based on the stored user identification data and audio data received from an audio sensor 130 using conventional voice and/or speech recognition techniques. The computer 110 may be programmed to store user identification data, e.g., of vehicle 100 user(s) 200, in a computer 110 memory.

The computer 110 may be programmed to detect an individual user 200 of the vehicle 100 based at least in part on image data, received from one or more camera sensors 130 with a field of view encompassing an area exterior to the vehicle 100, using conventional facial recognition techniques. For example, the user identification data may further include image characteristics of a user 200, e.g., facial properties of the user. The computer 110 may be programmed to apply image processing techniques to the received image data from vehicle 100 camera sensor(s) 130 to recognize a vehicle 100 user 200. Additionally or alternatively, the computer 110 may be programmed to identify a user 200 based on stored user identification data and data received from a combination of vehicle 100 sensors 130 such as an audio sensor 130, an image sensor 130, and/or a radio-frequency sensor 130.

The computer 110 may be programmed to detect an authorized vehicle 100 user 200 based on audio and image sensor 130 data. For example, the computer 110 may be programmed to determine that an authorized user 200 is detected upon detecting the user based on both voice and image of the user and stored user identification data.

Further, the sensors 130 may include one or more radio-frequency sensors 130 to detect a short-range data link to an external device 210 like a mobile device 210 carried by a user 200 (FIG. 2). The radio-frequency sensor 130 may include known electronic circuitry such as a wireless (or radio-frequency) signal transmitter, a wireless (or radio-frequency) signal receiver, and an amplifier circuit to boost an outgoing and incoming radio-frequency signal. The vehicle 100 computer 110 may be programmed to receive a wireless signal, via the radio-frequency sensor 130. The computer 110 may be programmed to identify an identifier of a device such as a mobile device 210 transmitting wireless signals based on the received wireless signal. The radio-frequency sensor 130 may be configured to receive wireless signals based on various wireless communication protocols, e.g., LTE (Long-Term Evolution), Bluetooth™, WAN (Wide Area Network), etc.

The computer 110 may be programmed to determine the distance d of the mobile device 210 to the vehicle 100, e.g., using techniques such as Free Space Path Loss (FSPL). The computer 110 may be programmed to determine the strength of a wireless signal of a mobile device 210 based on data received from the radio-frequency sensor 130. Based on FSPL, a loss (weakening) of an electromagnetic signal over a straight path between a transmitter, e.g., the mobile device 210, and a receiver, e.g., the radio-frequency sensor 130, may be proportional to the square of the distance d between the device 210 and the vehicle 100 reference point 140 (e.g., when radio-frequency sensor 130 is located at the vehicle 100 reference point 140), and also proportional to the square of a frequency of the radio signal.

The computer 110 may be programmed to determine the distance d upon determining the frequency of signals transmitted by the mobile device 210 and the loss of the signal received by the radio-frequency sensor 130. The computer 110 may be programmed to determine the frequency of the received signal based on a frequency associated to a used communication protocol and/or using Digital Signal Processing (DSP) techniques. The computer 110 may be programed to determine a loss of the received signal based on determining the output power of the mobile device 210 and the signal strength of the received signal based on data received from the radio-frequency sensor 130. As discussed below, the computer 110 may be programmed to determine whether a mobile device 210 is within an area 220, e.g., a round area on the ground surface around the vehicle 100 having a radius r, e.g., 50 meters (m). The computer 110 may be further programmed to determine the number of mobile devices 210 within the area 220 based on detected distance d of each device 210 from the vehicle 100.

In the present context, a user 200 proximity to a vehicle 100 is a distance d of the user 200 to the vehicle 100 reference point 140. The computer 110 may be programmed to determine that a user 200 is proximate to the vehicle 100 upon (i) determining that a distance d of a mobile device 210 carried by the respective user 200 to the vehicle 100 is less than a distance threshold $d_{thresh}$, e.g., 10 m, or (ii) identifying the user 200 based on image data received from a vehicle 100 camera sensor 130 within the distance threshold $d_{thresh}$. The computer 110 may be programmed to estimate a distance d to the user 200 recognized in the image data based on image processing techniques, e.g., optical flow techniques. For example, a user 200 within an area 220 with a radius r of 50 m is proximate when a distance d of the user 200 to the vehicle 100 is less than the distance threshold $d_{thresh}$ of 10 m. As discussed below, the computer 110 may be programmed to determine the distance threshold $d_{thresh}$ based on a risk index of the area 220 including vehicle 100 location.

The computer 110 may be programmed to determine the proximity of a user 200 to the vehicle 100 based on (i) a distance d of a user 200 mobile device 210 to the vehicle 100, and/or (ii) estimating a distance d of the user 200 from the vehicle 100 upon recognizing the user 200 based on the image data and user identification data.

The sensors 130 may further include a GPS (Global Positioning System) sensor 130. The computer 110 may receive a current location of the vehicle 100 based on data received from the GPS sensor 130. Additionally or alternatively, a GPS coordinate in proximity of the vehicle 100 reported by a mobile device 210 may be used to determine the location of the vehicle 100, e.g., upon determining based on FSPL techniques discussed above, that the distanced of the mobile device 210 to the vehicle 100 is less than a distance threshold, e.g., 10 meters (m).

The computer 110 may be configured for communicating through a vehicle-to-infrastructure (V-to-I) interface with a remote server computer, e.g., a cloud server, via a network, which, as described below, may utilize various wired and/or wireless networking technologies, e.g., cellular, Bluetooth™, wired and/or wireless packet networks, etc.

With reference to FIG. 2, a vehicle 100 computer 110 can be programmed to determine, based on vehicle 100 sensor 130 data, that an object 170 is present in a vehicle 100 compartment 150. The computer 110 can be programmed to actuate the vehicle 100 compartment 150 to close based on the object 170 presence, a user 200 proximity to the vehicle 100, and environmental data including at least one of a local risk index, an ambient light condition, and a local weather condition.

The environmental data are data specifying measurements of physical phenomena in an area 220, e.g., including a location of the vehicle 100. Such physical phenomena can include an amount of ambient light typically measured in lumens (or lux), an ambient temperature, presence or absence of precipitation, a type of precipitation, a wind speed, etc. In one example, environmental data can be used to specify a weather condition in an example range of 1 (good weather, e.g., sunny, no rain) to 10 (fully inclement weather condition, e.g., wind, hail, rain, etc.). Further, environmental data can be used as input for determining a risk index for the area 220 to which the environmental data pertains. as described further below.

A risk index, in the present context, is a numerical measure specifying a likelihood of theft at the location of the vehicle 100 and/or in an area 220 including the location of a vehicle 100. The risk index may be specified in a numerical range, e.g., 1 (low risk) to 10 (high risk).

A risk of theft may be based on a population density of an area 220 and/or a number or persons presently proximate to a vehicle 100, and alternatively or additionally could be based on an amount of ambient light and/or time of day. In an example, the computer 110 is programmed to determine the number of mobile devices 210 present within a distance d of the vehicle 100, and to determine a risk index for an area 220 based on the number of the mobile devices 210 present within the distance d of the vehicle 100. For example, the computer 110 may be programmed to determine a low risk (e.g., 1 on a scale of 1 to 10) when a number of devices 210 within the area 220 is less than 5 devices, to determine a medium risk (e.g., 5 on a scale of 1 to 10) when the number of devices 210 is between 5 and 10 devices, and to determine a high risk (e.g., 10 on a scale of 1 to 10) when the number of devices 210 within the area 220 exceeds 10 devices.

A vehicle 100 user 200 may make multiple trips to, e.g., unload or load, the vehicle 100. A vehicle 100 compartment 150 may be left open unattended. A duration of time when a vehicle 100 is unattended by a user 200 may vary, e.g., depending on a distance a user 200 must carry and object 170 be loaded or unloaded. Typically a vehicle 100 left unattended and/or unlocked and/or open for a greater duration has a higher risk index. In one example, the computer 110 may be programmed to determine that a risk index is below a threshold, e.g., medium risk, upon determining that an average duration of the vehicle 100 being unattended is shorter than a specified threshold duration, e.g., 30 seconds (s), and to maintain the vehicle 100 compartment 150 in an open state upon determining that the risk index is less than the risk threshold.

The computer 110 may be programmed to determine the risk threshold based on a type of identified object 170 stored in the vehicle 100 compartment 150. In one example, the computer 110 may be programmed to estimate a value of the object(s) 170 based on a type of object 170 in a unitless range, e.g., 1 (low) to 5 (high), based on stored information in the computer 110 memory, image data received from the camera sensor 130, etc. The computer 110 may be programmed to determine a type of object 170 based on image data using image processing techniques and to estimate the value based on information stored in the memory, e.g., Table 2.

TABLE 2

| Object Type | Object Value |
| --- | --- |
| Food | 1 |
| Furniture | 2 |
| Sport equipment | 3 |
| Electronic equipment | 4 |
| Antiquities | 5 |

The computer 110 may be programmed to determine a risk threshold based on the object 170 value. For example, the computer 110 may be programmed based on information stored in the computer 110 memory, e.g., Table 3, to determine the risk threshold, within a risk range of 1 (low) to 10 (high), based on the value of the object 170.

TABLE 3

| Object Value | Risk threshold |
|---|---|
| 1 | 6 |
| 2 | 5 |
| 2 | 4 |
| 4 | 3 |
| 5 | 2 |

As discussed above, a risk index (which can be compared to a risk threshold) for an area 220 may be determined based on inputs such as environmental data, time of day, and/or a number of devices 210 within the area 220. The computer 110 may be programmed to determine the risk based on a combination of various inputs using information stored in the computer 110 memory (e.g., Table 4).

TABLE 4

| Number of devices | Population density | Time of day | Risk (low, medium, high) |
|---|---|---|---|
| <5 | Low | Day | Low |
| <5 | High | Night | High |
| >20 | Medium | Night | High |
| <10 and >5 | Medium | Day | Medium |
| <10 and >5 | Low | Night | Medium |

The computer 110 may be programmed to actuate closure of a compartment 150, e.g., a vehicle 100 trunk, upon determining an object 170 presence in the respective compartment 150, and that the risk index exceeds a first risk threshold, e.g., 5, while the vehicle 100 user 200 is not within a proximity of the vehicle 100, e.g., 10 meters. The computer 110 may be programmed to actuate a vehicle 100 actuator 120 to close the compartment 150 (e.g., by closing a liftgate 160, door 160, etc.) while keeping the compartment 150 in an unlocked position or actuating the compartment 150 to close and actuate a lock to move to a locked position. In other words, the computer 110 may be programmed to close and lock the compartment 150, or only to close while keeping the compartment 150 in an unlocked position. For example, the computer 110 can be programming according to Table 5. Table 5 specifies an example set of actuation commands based on a risk index and a user 200 distance to the vehicle 100.

TABLE 5

| Risk index | User distance to vehicle | Actuation |
|---|---|---|
| <5 | <$d_{thresh}$ | Open compartment with object therein; unlock other compartments |
| >5 or = 5 | <$d_{thresh}$ | Open compartment with object therein; keep other compartments locked |
| Not applicable | >$d_{thresh}$ | Close and lock the opened compartment; lock other compartments |

The computer 110 may be programmed to open the compartment 150 in which the object 170 is present, upon determining that the vehicle 100 user 200 is proximate to the vehicle 100, e.g., within a distance threshold $d_{thresh}$ of 10 m. In one example, the computer 110 may be programmed to open the compartment 150 with the object 170 present therein and to unlock (while keeping them closed) other compartments 150, e.g., cabin doors.

The computer 110 may be programmed to determine the distance threshold $d_{thresh}$ based on a risk index of the area 220, e.g., according to example Table 6. Table 6 specifies example distance thresholds $d_{thresh}$ for various risk index ranges. For example, the computer 110 may determine a distance threshold $d_{thresh}$ of 20 m upon determining a risk index of less than a risk threshold 5 and to determine a distance threshold $d_{thresh}$ of 10 m upon determining a risk index of greater than 5. In other words, in an area 220 with a higher risk index a shorter distance threshold $d_{thresh}$ may be used.

TABLE 6

| Risk index | Distance threshold $d_{thresh}$ |
|---|---|
| <5 | 20 meters |
| >5 or = 5 | 10 meters |

In some examples, based on a risk index of the area 220, it may be beneficial to only open the compartment 150 with object 170 present while keeping other compartments 150 of the vehicle 100 in the locked position. The computer 110 may be programmed to identify the vehicle 100 compartment 150, e.g., the vehicle 100 trunk compartment 150, based on the vehicle 100 object 170 presence, and to actuate a second vehicle compartment 150, e.g., cabin door, to lock (or to maintain in the locked position) while the user 200 is within the proximity of the vehicle 100 upon determining that the local risk index exceeds a threshold, e.g., 5 in a risk range of 1 (low) to 10 (high).

In one example, the computer 110 may be programmed to maintain a second vehicle compartment 150 in a locked state (or position) upon determining that a local risk index exceeds a second risk threshold, e.g., 7, that is greater than the first risk threshold. Putting in a different way, a higher second risk threshold may be applied to keep other compartments 150 locked while only opening the compartment with the object 170 present therein compared to the first risk threshold that is applied for determining whether to close the compartment while being unattended. This may, for example, prevent theft from an interior cabin of the vehicle 100 while the user 200 is unloading the trunk compartment 150. The computer 110 may be programmed to unlock the second vehicle compartment 150 upon determining that the local risk index is less than the second risk threshold.

Leaving a vehicle 100 compartment 150 may change a temperature of an object 170 in the vehicle 100 compartment 150 based on an ambient temperature and an object 170 temperature, e.g., ice cream may become warm and a hot pizza may become cold. The computer 110 may be programmed to actuate the vehicle 100 compartment 150 to close upon determining that the user 200 is not proximate to the vehicle 100 based on the user 200 proximity status and determining, based on an ambient temperature included in the local weather condition and an object temperature, that a difference between the object temperature and the ambient temperature exceeds a threshold, e.g., 30 degrees Celsius.

The computer 110 may be programmed to determine the ambient temperature based on the weather data received from a remote computer and/or based on data received from a vehicle 100 ambient temperature sensor 130, e.g., mounted to an interior surface of a vehicle 100 bumper. The computer 110 may estimate the object 170 temperature based on data stored in the computer 110, e.g., data including a pizza delivery order information, and/or image data including image of ice cream package, pizza package, etc.

As discussed above, the computer 110 may be programmed to identify an authorized user 200 based on a stored user identification data and the sensor 130 data received from the camera sensor 130, radio-frequency sensor 130, audio sensor 130, etc. In some examples, a second user 200 may be authorized to access the vehicle 100 but the stored user identification data may lack the second user 200 data. The computer 110 may be programmed to actuate the vehicle 100 compartment 150 to open upon determining that at least one of the user 200 and a second authorized user 200 arrived within a proximity of the vehicle 100. The computer 110 may identify the second user 200 and determine that the second user 200 is authorized using various techniques discussed below.

The computer 110 may be programmed to identify a second authorized user 200 based on a proximity of a mobile device 210, image data received from a vehicle 100 camera sensor 130, or audio data received from a vehicle 100 audio sensor 130 stored data, and to actuate the vehicle 100 compartment 150 to open upon determining that the second user 200 is proximate to the vehicle 100 while the user 200 is not proximate to the vehicle 100.

The computer 110 may be programmed to identify the second authorized user 200 upon recognizing an interaction of the 200 user (i.e., user 200 corresponding to the stored user identification data) and the second authorized user 200 exceeding a minimum time threshold e.g., 5 minutes (min), based on the received image data. For example, the computer 110 may be programmed to identify the second user 200 as authorized upon determining based on image data that the first and second user 200 are in the field of view of a vehicle 100 camera sensor 130 for at least 5 minutes, e.g., sitting in the vehicle 100, standing outside the vehicle 100, etc. Upon determining that an individual is authorized as a second user 200, the computer 110 may update the user identification data to include the second user 200 data, e.g., facial image, sound characteristics, etc., as discussed above.

The computer 110 may be programmed to identify an individual as a second authorized user 200 upon recognizing a verbal communication of the user and the individual exceeding a minimum time threshold, e.g., 5 minutes, based on the received audio data. The computer 110 may be programmed to recognize a verbal communication of the first user 200 and the individual based on the received audio and/or image data. For example, the computer 110 may be programmed to determine a verbal interaction upon detecting a number of voice interaction exceeding a threshold, e.g., 5. A voice interaction is, for example, a question and a response, e.g., the first user 200 asking a question and the second user 200 providing an answer. The computer 110 may be programmed to determine an interaction of the first and second user 200, e.g., by determining based on image data that first and the second user 200 shake hands, hug one another, etc.

In another example, a vehicle 100 computer 110 can be programmed to, according to example Table 7, upon determining based on vehicle 100 sensor 130 data that a vehicle 100 user 200 is within a specified distance d of the vehicle 100, identify a first vehicle 100 compartment 150 for the user 200 based on stored data and a location of the user 200 relative to the vehicle 100, then, upon determining that a risk index exceeds a first threshold $r_1$ and is less than a second threshold $r_2$, actuate a first vehicle 100 compartment 150 to unlock the first vehicle compartment 150 while maintaining a second vehicle compartment 150 at a locked position, and, upon determining that the risk index is less than the risk threshold $r_1$, to actuate the second vehicle compartment 150 to unlock. Table 7 shows an example set of actuations of vehicle 100 actuators 120 to lock or unlock vehicle 100 compartments 150 based on a user 200 distance d to the vehicle 100 and a risk index of the area 220.

TABLE 7

| Risk index | User distance to vehicle | Actuation |
|---|---|---|
| $<r_1$ | $<d_{thresh}$ | Unlock first and second compartment, e.g., cabin door and trunk |
| $<r_2$ and $>r_1$ | $<d_{thresh}$ | Unlock first compartment, e.g., trunk, and keep the second compartment, e.g., interior, locked |
| $>r_2$ | $>d_{thresh}$ | Close and lock the opened compartment; lock other compartments |

Figure 3A:
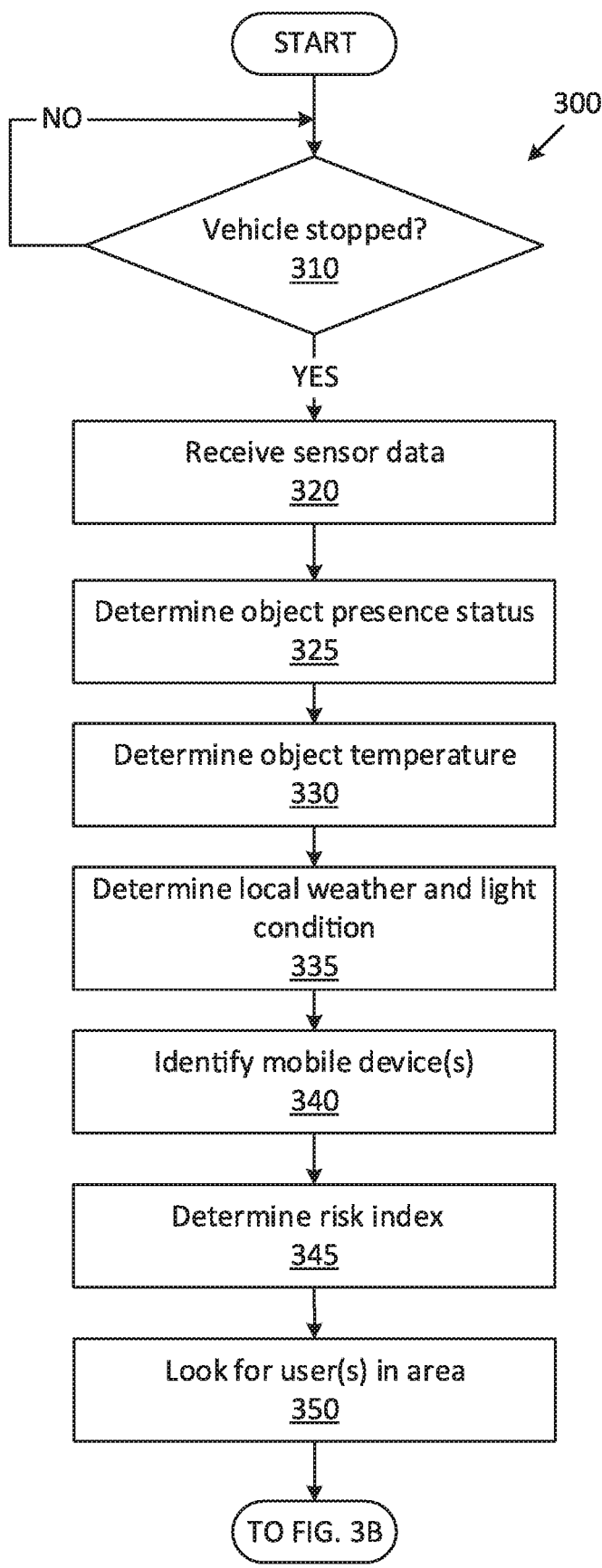
FIGS. 3A-3C are an example flowchart for an exemplary process for unloading or loading of the vehicle.
Figure 3B:
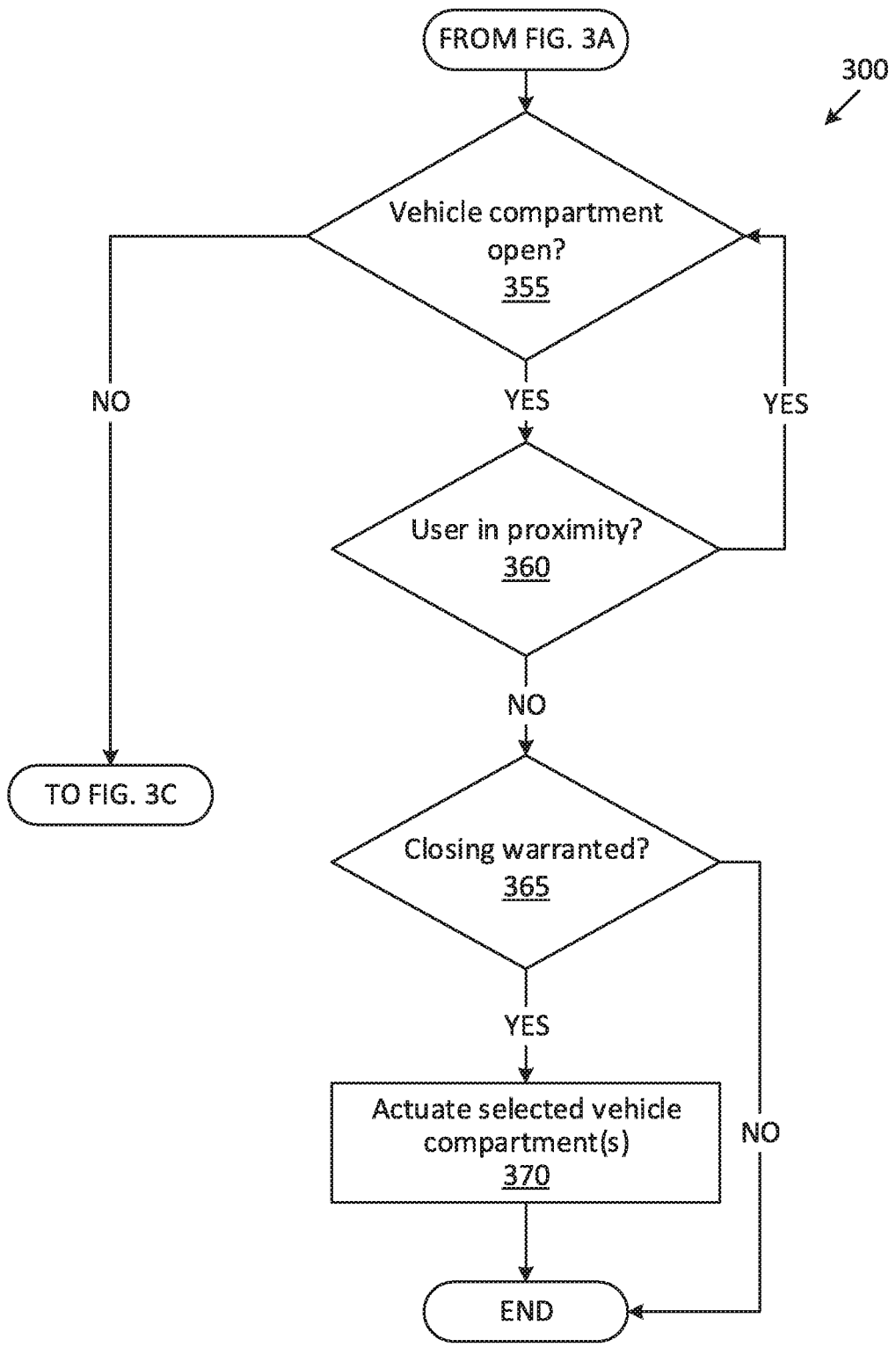
Figure 3C:
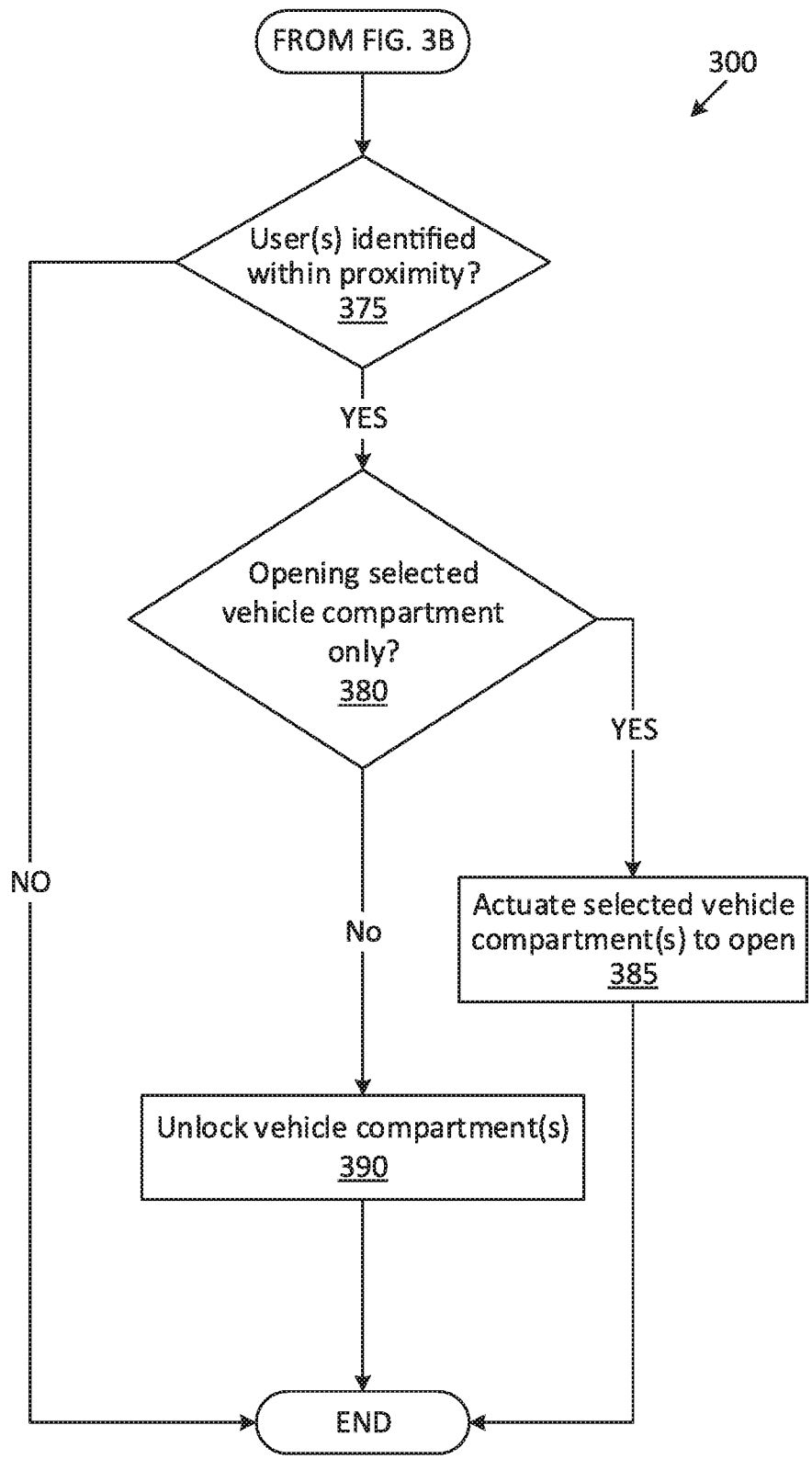

FIGS. 3A-3C show a flowchart of an exemplary process 300 for loading and/or unloading of the vehicle 100. The vehicle 100 computer 110 may be programmed to execute blocks of the process 300.

With reference to FIG. 3A, the process 300 begins in a decision block 310, in which the computer 110 determines whether the vehicle 100 is stopped. The computer 110 may be programmed to determine that the vehicle 100 is stopped based on data received from a speed sensor 130, an engine controller, etc. For example, the computer 110 may be programmed to determine that the vehicle 100 is stopped upon determining that a vehicle 100 speed has been 0 (zero) for at least a specified time, e.g., 1 minute (min). If the computer 110 determines that the vehicle 100 is stopped, then the process 300 proceeds to a block 320; otherwise the process 300 returns to the decision block 310.

In the block 320, the computer 110 receives sensor 130 data, e.g., data from an audio sensor 130, camera sensor 130, radio-frequency sensor 130, thermal sensor 130, etc.

Next, in a block 325, the computer 110 determines object(s) 170 presence(s). The computer 110 may be programmed to determine whether an object 170 is present in a vehicle 100 compartment 150, as well as a location of the object 170, e.g., the trunk compartment 150, and/or object 170 data including a type, estimated dimensions, estimated weight, etc.

Next, in a block 330, the computer 110 determines a temperature of the object 170. In one example, the computer 110 may be programmed to estimate the object 170 temperature based on data received from a thermal camera sensor 130. In another example, as discussed above, the computer 110 may be programmed to estimate the temperature of the object 170 based on the received image data and information, e.g., Table 1, stored in the computer 110 memory.

Next, in a block 335, the computer 110 determines environmental data, e.g., a local weather condition, e.g., temperature, precipitation, etc., based on the data received from a remote computer, and/or determines ambient light condition, e.g., based on data received from a vehicle 100 light sensor 130.

Next, in a block 340, the computer 110 determines a number of mobile devices 210 within the area 220. As discussed above, the computer 110 may be programmed to determine a distance d from the vehicle 100 to a mobile device 210 based on data received from the vehicle 100 radio-frequency sensor 130, e.g., using FSPL technique. Thus, the computer 110 may be programmed to determine whether a mobile device 210 is within a circular shaped area 220 based on the determined distance d and a radius r of the area 220.

Next, in a block 345, the computer 110 determines a risk index. The computer 110 may be programmed, e.g., based on Table 4, to determine the risk index for the area 220 based on one or more inputs including a local crime index, a number of mobile devices 210 in the area 220, etc.

Next, in a block 350, the computer 110 looks for user(s) 200 in the area 220. The computer 110 may be programmed to identify the user(s) 200 based on data received from the image sensor 130, audio sensor 130, and/or radio-frequency sensor 130. As discussed above, the computer 110 may identify a second authorized user 200 and update the user identification data based on image data, verbal communication, and/or interaction of the second user 200 and the first user 200. Following the block 350, the process 300 proceeds to a decision block 355 (FIG. 3B).

With reference to FIG. 3B, in the decision block 355, the computer 110 determines whether a vehicle 100 compartment 150 is open. The computer 110 may be programmed to determine whether, e.g., a trunk liftgate 160, is open. The computer 110 may be programmed to determine that the compartment 150 with object 170 present therein is open based on object presence status and the sensor 130 including status of the compartment 150 door 160. If the computer 110 determines that the compartment 150 is open, then the process 300 proceeds to a decision block 360; otherwise the process 300 proceeds to a decision block 375 (FIG. 3C).

In the decision block 360, the computer 110 determines whether the user 200 is in proximity of the vehicle 100, i.e., whether the user 200 is within a distance threshold $d_{thresh}$, e.g., 10 m, of the vehicle 100. If the computer 110 determines that a user 200 is within the distance threshold $d_{thresh}$ of the vehicle 100, then the process 300 returns to the decision block 355; otherwise the process 300 proceeds to a decision block 365.

In the decision block 365, the computer 110 determines whether the closing of the vehicle 100 compartment 150 is warranted. The computer 110 may be programmed to determine that closing of the vehicle 100 compartment 150 with the object 170 present therein is warranted upon determining that the risk index exceeds a risk threshold. Additionally or alternatively, the computer 110 may be programmed to determine that the compartment 150 closing is warranted, upon determining that a difference between the object 170 temperature and the ambient temperature exceeds a threshold, e.g., 30 degrees Celsius. Additionally or alternatively, the computer 110 may be programmed to determine that a closing of the compartment 150 is warranted upon determining based on the light condition that an ambient light intensity is less than a threshold, 40 lux. If the computer 110 determines that the closing is warranted, then the process 300 proceeds to a block 370; otherwise the process 300 ends, or alternatively, returns to the decision block 310, although not shown in FIGS. 3A-3B.

In the block 370, the computer 110 actuates the selected compartments 150 to close. The computer 110 may be programmed to actuate an actuator 120 to close the open compartment 150 with the object 170 present therein. For example, the computer 110 may be programmed to actuate a trunk liftgate 160 to close. Following the block 370, the process 300 ends, or alternatively, returns to the decision block 310, although not shown in FIGS. 3A-3B.

Turning to FIG. 3C, in the decision block 375, which can be reached from the decision block 355, the computer 110 determines whether user(s) 200 are proximate to the vehicle 100. If the computer 110 determines that one or more vehicle 100 users 200 are proximate to the vehicle 100, then the process 300 proceeds to a decision block 380; otherwise the process 300 ends, or alternatively, returns to the decision block 310, although not shown in FIGS. 3A-3B.

In the decision block 380, the computer 110 determines whether to open a selected vehicle 100 compartment 150. In one example, the computer 110 may be programmed to select a vehicle 100 compartment 150 with an object 170 present therein to open. In one example, upon determining that no object 170 is present in a vehicle 100 compartment 150, the computer 110 may select no compartment 150 for opening, e.g., when a user 200 approaches the vehicle 100 to enter the vehicle 100. In such example, it may be needed only to unlock the compartments 150, so that the user 200 can enter the vehicle 100. If the computer 110 selects one or more compartments 150 to open, then the process 300 proceeds to a block 385; otherwise the process 300 proceeds to a block 390.

In the block 385, the computer 110 actuates the vehicle 100 actuator(s) 120 to open the selected compartment(s) 150. For example, the computer 110 may be programmed to actuate an actuator 120 to open the liftgate 160 of the trunk compartment 150. Following the block 385, the process 300 ends, or alternatively, returns to the decision block 310, although not shown in FIGS. 3A-3C.

In the block 390, the computer 110 actuates the vehicle 100 actuators to unlock the compartments 150 of the vehicle 100. As discussed above, based on the risk index of the area 220, the computer 110 may be programmed to unlock a specified compartment 150, e.g., a compartment 150 nearest to the user 200, while maintaining other compartments 150 in the locked position. Following the block 390, the process 300 ends, or alternatively, returns to the decision block 310, although not shown in FIGS. 3A-3C.

Computing devices such as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in stored in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer, comprising a processor and a memory, the memory storing instructions executable by the processor to:
   determine, based on vehicle sensor data, that an object is present in a vehicle compartment;
   determine a number of mobile devices present within a distance of the vehicle; and
   actuate the vehicle compartment to close based on the object presence, a user proximity to the vehicle, and environmental data including at least a risk index and an environmental condition, wherein the risk index is determined at least in part based on the number of the mobile devices present within the distance of the vehicle.

2. The computer of claim 1, wherein the instructions further include instructions to actuate the vehicle compartment to open upon determining that at least one of the user and a second authorized user are within a proximity of the vehicle.

3. The computer of claim 2, wherein the instructions further include instructions to:
   identify the vehicle compartment based on the vehicle object presence; and
   actuate a second vehicle compartment to close while the user is within the proximity of the vehicle upon determining that the risk index exceeds a threshold.

4. The computer of claim 1, wherein the vehicle compartment is a vehicle trunk, a vehicle passenger cabin, or a container.

5. The computer of claim 1, wherein the instructions further include instructions to:
   determine the risk index based at least in part where the number of the mobile devices present within the distance of the vehicle is more than one.

6. The computer of claim 1, wherein the instructions further include instructions to determine the risk index based on a time of day.

7. The computer of claim 6, wherein the instructions further include instructions to determine a risk threshold based on a type of identified object stored in the vehicle compartment and actuate the compartment to close further based on the determined risk threshold.

8. The computer of claim 6, wherein the instructions further include instructions to determine a distance threshold based on a location of the vehicle, wherein a first distance threshold for a first area with a first risk index is less than a second distance threshold for a second area with a second risk index less than the first risk index.

9. The computer of claim 1, wherein the instructions further include instructions to determine that the risk index is below a threshold upon determining that an average absence interval of the user is shorter than a time threshold; and maintain the vehicle compartment in an open state upon determining that the risk index is less than a risk threshold.

10. The computer of claim 1, wherein the instructions further include instructions to identify the user based on stored user identification data and data received from vehicle sensors including an audio sensor, an image sensor, or a wireless communication interface.

11. The computer of claim 1, wherein the instructions further include instructions to:
    identify a second authorized user based on a proximity of a mobile device, image data received from a vehicle camera sensor, or audio data received from a vehicle audio sensor stored data; and
    actuate the vehicle compartment to open upon determining that the second authorized user is proximate to the vehicle while the user is not proximate to the vehicle.

12. The computer of claim 11, wherein the instructions further include instructions to determine that a user is proximate to the vehicle upon (i) determining that a user mobile device is within a distance of the vehicle, or (ii) identifying the user based on image data received from the vehicle camera sensor.

13. The computer of claim 11, wherein the instructions further include instructions to identify the second authorized user upon recognizing a verbal communication of the user and the second authorized user exceeding a minimum time threshold based on the received audio data.

14. The computer of claim 11, wherein the instructions further include instructions to identify the second authorized user upon recognizing an interaction of the user and the second authorized user exceeding a minimum time threshold based on the received image data.

15. The computer of claim 11, wherein the instructions further include instructions to maintain a second vehicle compartment in a locked state upon determining that a risk index exceeds a first threshold and is less than a second threshold.

16. The computer of claim 15, wherein the instructions further include instructions to unlock the second vehicle compartment upon determining that the risk index is less than the first threshold.

17. The computer of claim 1, wherein the instructions further include instructions to actuate the vehicle compartment to close upon determining that the user is not proximate to the vehicle based on a distance of the user to the vehicle and determining, based on an ambient temperature included in the environmental condition and an object temperature, that a difference between the object temperature and the ambient temperature exceeds a threshold.

18. The computer of claim 1, wherein the environmental data includes an ambient light intensity and the instructions further include instructions to actuate the vehicle compartment to close based on the ambient light intensity.

\* \* \* \* \*